United States Patent
Mason et al.

(10) Patent No.: US 9,774,572 B2
(45) Date of Patent: Sep. 26, 2017

(54) OBFUSCATION OF REFERENCES TO NETWORK RESOURCES

(71) Applicant: salesforce.com, inc., San Francisco, CA (US)

(72) Inventors: Paul Anthony Mason, Port Talbot (GB); Harsimranjit Singh Chabbewal, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 74 days.

(21) Appl. No.: 14/708,925

(22) Filed: May 11, 2015

(65) Prior Publication Data

US 2016/0337320 A1 Nov. 17, 2016

(51) Int. Cl.
*H04L 29/06* (2006.01)
*H04L 29/08* (2006.01)
*G06F 17/30* (2006.01)

(52) U.S. Cl.
CPC .... *H04L 63/0428* (2013.01); *G06F 17/30887* (2013.01); *H04L 63/0442* (2013.01); *H04L 67/02* (2013.01); *H04L 63/108* (2013.01)

(58) Field of Classification Search
CPC  H04L 63/0428; H04L 67/02; G06F 17/30887
USPC .......................................................... 713/168
See application file for complete search history.

(56) References Cited

U.S. PATENT DOCUMENTS

| | | | | |
|---|---|---|---|---|
| 6,662,230 B1* | 12/2003 | Eichstaedt | .............. | G06F 21/62 709/217 |
| 6,775,772 B1* | 8/2004 | Binding | .............. | H04L 63/0428 380/279 |
| 6,963,971 B1* | 11/2005 | Bush | ...................... | H04L 9/0894 713/153 |
| 7,165,175 B1* | 1/2007 | Kollmyer | .......... | H04L 29/06027 348/E7.056 |
| 7,509,490 B1* | 3/2009 | Hsu | ..................... | G06Q 20/0855 705/74 |
| 7,870,389 B1* | 1/2011 | Leung | ..................... | H04L 9/083 380/255 |
| 7,921,288 B1* | 4/2011 | Hildebrand | ............. | H04L 63/04 713/165 |
| 8,005,735 B2* | 8/2011 | Ginsberg | ............... | G06K 17/00 705/30 |
| 8,341,753 B2* | 12/2012 | Birum | ..................... | A63F 13/10 380/200 |
| 8,542,823 B1* | 9/2013 | Nguyen | .............. | G06F 21/6218 380/42 |
| 8,543,821 B1* | 9/2013 | Gabrielson | ...... | H04N 21/23476 713/171 |

(Continued)

*Primary Examiner* — Hadi Armouche
*Assistant Examiner* — Shahriar Zarrineh
(74) *Attorney, Agent, or Firm* — Meyertons, Hood, Kivlin, Kowert & Goetzel, P.C.

(57) ABSTRACT

Techniques are disclosed relating to protecting sensitive data in references to network resources. In some embodiments, a host system receives a request for a stored resource, where a first portion of the request is encrypted by a client device using a particular encryption technique and a second portion of the request is not encrypted using the particular encryption technique and where the first portion of the request includes a reference to the resource. In some embodiments, the host decrypts the reference to the resource and provides the resource to the requesting device based on the decrypted reference.

13 Claims, 4 Drawing Sheets

(56) References Cited

U.S. PATENT DOCUMENTS

| | | | | |
|---|---|---|---|---|
| 8,983,061 B2* | 3/2015 | Watanabe | H04L 63/0428 | 380/262 |
| 9,009,480 B1* | 4/2015 | Wu | H04L 9/0819 | 713/171 |
| 9,118,634 B2* | 8/2015 | Carlson | H04L 63/0428 | |
| 9,344,393 B2* | 5/2016 | Boynton | H04L 12/5895 | |
| 9,444,794 B2* | 9/2016 | Giladi | H04L 63/0428 | |
| 2002/0095567 A1* | 7/2002 | Royer | H04L 63/0428 | 713/150 |
| 2003/0037070 A1* | 2/2003 | Marston | G06F 21/10 | |
| 2003/0177386 A1* | 9/2003 | Cuomo | G06F 21/6227 | 713/193 |
| 2004/0064713 A1* | 4/2004 | Yadav | G06F 21/606 | 713/193 |
| 2004/0078426 A1* | 4/2004 | Nagami | H04L 47/10 | 709/203 |
| 2004/0088295 A1* | 5/2004 | Glazer | G06F 21/604 | |
| 2004/0122925 A1* | 6/2004 | Offermann | H04L 29/12594 | 709/223 |
| 2004/0230820 A1* | 11/2004 | Hui Hsu | H04L 63/0281 | 726/26 |
| 2004/0236940 A1* | 11/2004 | Asai | G06F 21/10 | 713/150 |
| 2005/0232415 A1* | 10/2005 | Little | G06F 21/72 | 380/28 |
| 2005/0273592 A1* | 12/2005 | Pryor | H04L 9/32 | 713/150 |
| 2006/0090074 A1* | 4/2006 | Matoba | H04L 63/0272 | 713/171 |
| 2006/0195687 A1* | 8/2006 | Klein | H04L 63/0428 | 713/150 |
| 2007/0061593 A1* | 3/2007 | Celikkan | H04L 63/0442 | 713/189 |
| 2007/0174271 A1* | 7/2007 | Mattsson | G06F 17/30477 | |
| 2008/0098236 A1* | 4/2008 | Pandey | G06F 11/1464 | 713/189 |
| 2008/0118064 A1* | 5/2008 | Bhogal | G06F 21/6218 | 380/243 |
| 2010/0042734 A1* | 2/2010 | Olafsson | H04L 63/0236 | 709/229 |
| 2010/0161984 A1* | 6/2010 | Pauker | H04L 63/0442 | 713/168 |
| 2011/0231649 A1* | 9/2011 | Bollay | H04L 63/166 | 713/151 |
| 2012/0207306 A1* | 8/2012 | Candelore | H04L 67/06 | 380/287 |
| 2013/0007849 A1* | 1/2013 | Coulter | G06F 21/10 | 726/4 |
| 2013/0091545 A1* | 4/2013 | Macdonald | G06F 12/1416 | 726/2 |
| 2014/0304505 A1* | 10/2014 | Dawson | G06F 21/6227 | 713/165 |
| 2015/0082022 A1* | 3/2015 | Marinkovic | H04L 63/0442 | 713/153 |
| 2015/0222436 A1* | 8/2015 | Morten | G07C 9/00571 | 713/176 |
| 2015/0271302 A1* | 9/2015 | Luby | H04L 67/02 | 709/219 |
| 2015/0288667 A1* | 10/2015 | Alder | H04L 63/061 | 713/171 |
| 2016/0127317 A1* | 5/2016 | Ardeli | H04L 63/0236 | 726/14 |

* cited by examiner

OBFUSCATION OF REFERENCES TO NETWORK RESOURCES

BACKGROUND

Technical Field

This disclosure relates to secure communications and more particularly to protecting sensitive data in references to network resources.

Description of the Related Art

Providers of resources (e.g., web applications, websites, data, files, etc.) over a network (e.g., the Internet) typically use references (e.g., uniform resource locators (URLs) or uniform resource identifiers (URIs)) to identify and provide resources to various users. For example, a user may select a link on a web page that uses the reference www.host.com/resourceA to direct the browser to desired resource "resourceA" that is accessible via the host.com server. A reference may sometimes include sensitive information such as personal information (e.g., passwords or file names) and/or information about what resources a user is accessing (e.g., potentially embarrassing websites). Man-in-the-middle malicious attacks may utilize information in the references to extract customer data, for example. These attacks may read the data directly from the reference, use the reference information in replay attacks, and/or alter communications between the user and the content provider, for example.

These attacks may occur in multi-tenant database systems and system-wide solutions available to multiple tenants may be desired. Multi-tenant database systems allow users to access applications and/or data from a network source that, to the user, appears to be centralized, but might actually be distributed for backup, redundancy and/or performance reasons. An example of a multi-tenant system is a computing system that is accessible to multiple independent parties to provide those parties with application execution and/or data storage. Where there is an appearance of centralization, and network access, each subscribing party (e.g., a "tenant") can access the system to perform application functions, including manipulating that tenant's data. Each tenant may provide content to multiple users (e.g., customers or employees) and safeguarding user data is typically important.

With a multi-tenant system, the tenants have the advantage that they need not install software, maintain backups, move data to laptops to provide portability, etc. Rather, each tenant user need only be able to access the multi-tenant system to operate the applications and access that tenant's data. One such system usable for customer relationship management is the multi-tenant system accessible to salesforce.com subscribers. With such systems, a user need only have access to a user system with network connectivity, such as a desktop computer with Internet access and a browser or other HTTP client, or other suitable Internet client.

Techniques to protect information in references to network resources are desired, in multi-tenant systems as well as various other types of systems.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION

Figure 1:
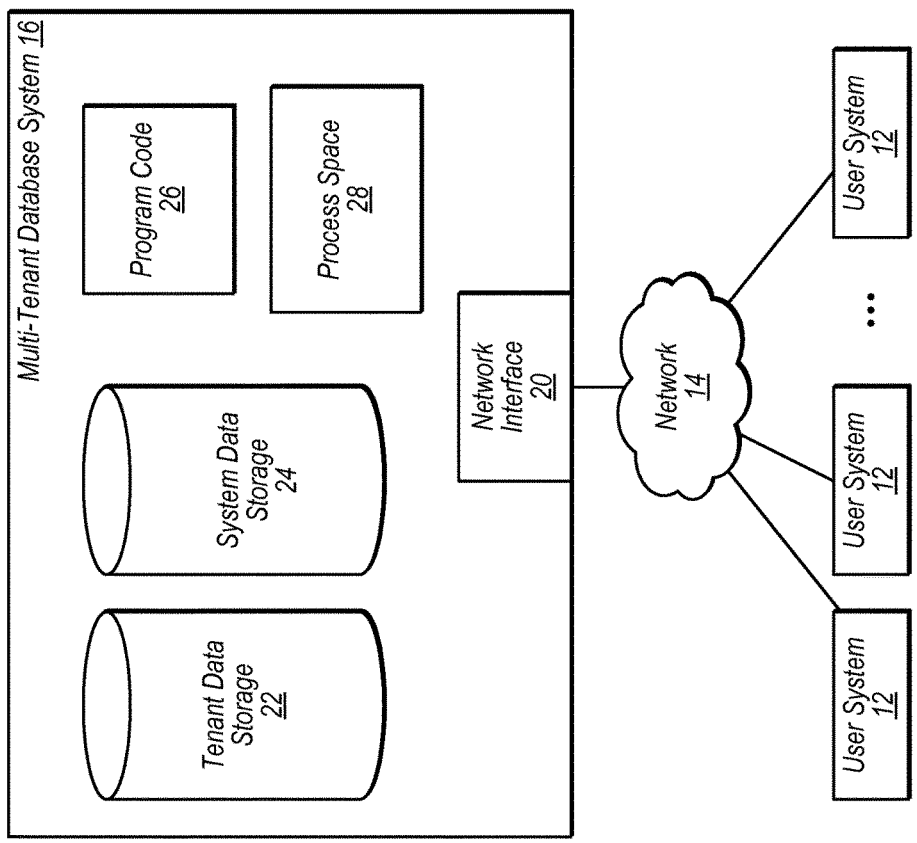
FIG. 1 is a block diagram illustrating an exemplary environment for a multi-tenant database system, according to some embodiments.
Figure 2:
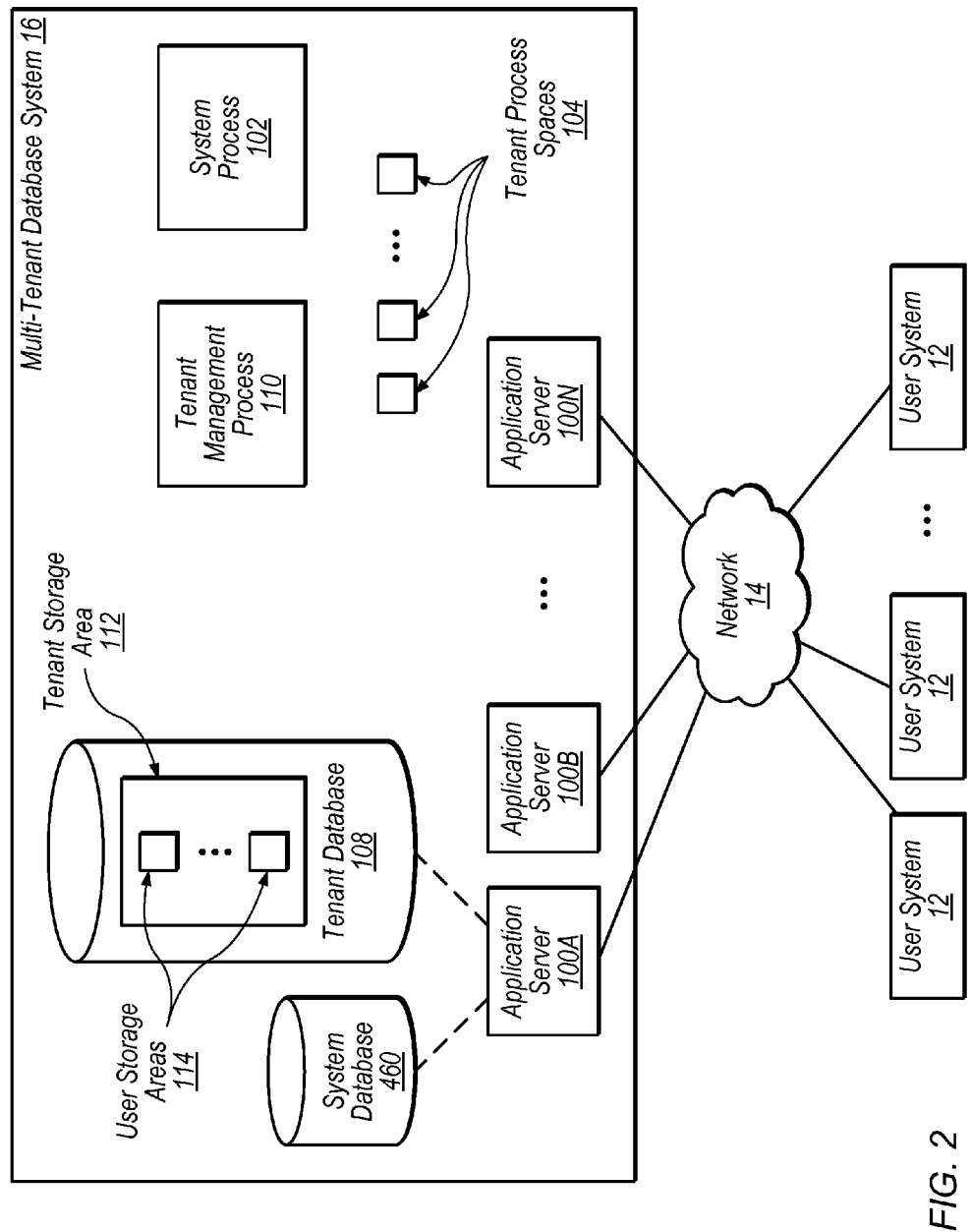
FIG. 2 is a block diagram illustrating an exemplary multi-tenant database system in more detail, according to some embodiments.

This disclosure initially describes, with reference to FIGS. 1-2, embodiments of an exemplary multi-tenant database system. It then describes, with reference to FIGS. 3-4, embodiments relating to client-side URL encryption of references to network resources. In various embodiments, the disclosed techniques may protect sensitive information in URLs, for example.

Exemplary Multi-Tenant Database System

FIG. 1 illustrates an exemplary environment in which a multi-tenant database system might be implemented. As illustrated in FIG. 1 (and in more detail in FIG. 2) one or more user systems 12 may interact via a network 14 with a multi-tenant database system (MTS) 16. The users of those user systems 12 may be users in differing capacities and the capacity of a particular user system 12 might be determined by the current user. For example, when a salesperson is using a particular user system 12 to interact with MTS 16, that user system 12 may have the capacities allotted to that salesperson. However, while an administrator is using the same user system 12 to interact with MTS 16, it has the capacities allotted to that administrator.

Network 14 may be a LAN (local area network), WAN (wide area network), wireless network, point-to-point network, star network, token ring network, hub network, or any other appropriate configuration. The global internetwork of networks often referred to as the "Internet" with a capital "I," will be used in many of the examples herein and is one example of a TCP/IP (Transfer Control Protocol and Internet Protocol) network. It should be understood, however, that the networks that the present invention may utilize any of various other types of networks.

User systems 12 may communicate with MTS 16 using TCP/IP and, at a higher network level, use other common Internet protocols to communicate, such as HTTP, FTP, AFS, WAP, etc. As an example, where HTTP is used, user system 12 might include an HTTP client commonly referred to as a "browser" for sending and receiving HTTP messages from an HTTP server at MTS 16. Such a server might be implemented as the sole network interface between MTS 16 and network 14, but other techniques might be used as well or instead. In some implementations, the interface between MTS 16 and network 14 includes load sharing functionality, such as round-robin HTTP request distributors to balance loads and distribute incoming HTTP requests evenly over a plurality of servers. Preferably, each of the plurality of servers has access to the MTS's data, at least for the users that are accessing a server.

In some embodiments, the system shown in FIG. 1 implements a web-based customer relationship management (CRM) system. For example, in some embodiments, MTS 16 includes application servers configured to implement and execute CRM software applications as well as provide related data, code, forms, web pages and other information to and from user systems 12 and to store to, and retrieve from, a database system related data, objects and web page content. In embodiments of a multi-tenant system, tenant data is preferably arranged so that data of one tenant is kept separate from that of other tenants so that that one tenant does not have access to another tenant's data, unless such data is expressly shared.

One arrangement for elements of MTS 16 is shown in FIG. 1, including a network interface 20, storage 22 for tenant data, storage 24 for system data accessible to MTS 16 and possibly multiple tenants, program code 26 for implementing various functions of MTS 16, and a process space 28 for executing MTS system processes and tenant-specific processes, such as running applications as part of an application service.

Several elements in the system shown in FIG. 1 may include conventional, well-known elements that need not be explained in detail here. For example, each user system 12 may be a desktop personal computer, workstation, laptop, PDA, cell phone, or any WAP-enabled device or any other computing device capable of interfacing directly or indirectly to the Internet or other network connection. User system 12 may execute an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., subscriber of a CRM system) of user system 12 to access, process, and view information and pages available to it from MTS 16 over network 14. Each user system 12 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 16 or other systems or servers. As discussed above, the present invention is suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

In some embodiments, each user system 12 and its components are operator configurable using applications, such as a browser, that include computer code executable on one or more processing elements. Similarly, in some embodiments, MTS 16 (and additional instances of MTSs, where more than one is present) and their components are operator configurable using application(s) that include computer code executable on one or more processing elements. Thus, various operations described herein may be performed by executing program instructions stored on a non-transitory computer-readable medium and executed by one or more processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript.

According to one embodiment, each MTS 16 is configured to provide web pages, forms, applications, data, and/or media content to user systems 12 to support the access by user systems 12 as tenants of MTS 16. As such, in this embodiment, MTS 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, MTSs may include one or more logically and/or physically connected servers distributed locally or across one or more geographic locations. Additionally, the term "server" includes a computer system, including processing hardware and process space(s), and an associated storage system and database application as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

FIG. 2 illustrates exemplary embodiments of an MTS 16 and various interconnections in more detail. In this example, the network interface is implemented as one or more HTTP application servers 100. Also shown is system process space 102 including individual tenant process spaces 104, a system database 106, tenant database(s) 108 and a tenant management process space 110. Tenant database 108 might be divided into individual tenant storage areas 112, which can be either a physical arrangement or a logical arrangement. Within each tenant storage area 112, user storage 114 might be allocated for each user.

It should also be understood that each application server 100 may be communicably coupled to database systems, e.g., system database 106 and tenant database(s) 108, via, a different network connection. For example, one server $100_1$ might be coupled via the Internet 14, another server $100_{N-1}$ might be coupled via a direct network link, and another server $100_N$ might be coupled by yet a different network connection. Transfer Control Protocol and Internet Protocol (TCP/IP) are preferred protocols for communicating between servers 100 and the database system, however, it will be apparent to one skilled in the art that other transport protocols may be used to optimize the system depending on the network interconnect used.

In preferred aspects, each application server 100 is configured to handle requests for any user/organization. Because it is desirable to be able to add and remove application servers from the server pool at any time for any reason, there is preferably no server affinity for a user and/or organization to a specific application server 100. In one embodiment, therefore, an interface system (not shown) implementing a load balancing function (e.g., an F5 Big-IP load balancer) is communicably coupled between the servers 100 and the user systems 12 to distribute requests to the servers 100. In one aspect, the load balancer uses a least connections algorithm to route user requests to the servers 100. Other examples of load balancing algorithms, such as are round robin and observed response time, also can be used. For example, in certain aspects, three consecutive requests from the same user could hit three different servers, and three requests from different users could hit the same server. In this manner, MTS 16 is multi-tenant, wherein the MTS 16 handles storage of different objects and data across disparate users and organizations.

As an example of storage, one tenant might be a company that employs a sales force where each salesperson uses MTS 16 to manage their sales process. Thus, a user might maintain contact data, leads data customer follow-up data, performance data, goals and progress data, all applicable to that user's personal sales process (e.g., in tenant database 108). In some MTS embodiments, since all of this data and the applications to access, view, modify, report, transmit, calculate, eta, can be maintained and accessed by a user system having nothing more than network access, the user can manage his or her sales efforts and cycles from any of many different user systems. For example, if a salesperson is paying a visit to a customer and the customer has Internet access in their lobby, the salesperson can obtain critical updates as to that customer while waiting for the customer to arrive in the lobby.

While each user's sales data may be separate from other users' sales data regardless of the employers of each user, some data may be organization-wide data shared or accessible by a plurality or all of the sales three for a given organization that is a tenant. Thus, there may be some data structures managed by MTS 16 that are allocated at the tenant level while other data structures are managed at the user level. Because an MTS may support multiple tenants including possible competitors, the MTS should have security protocols that keep data, applications and application use separate. Also, because many tenants will opt for access to an MTS rather than maintain their own system, security, redundancy, up-time and backup are more critical functions and need to be implemented in the MTS.

In addition to user-specific data and tenant-specific data, MTS 16 might also maintain system level data usable by multiple tenants. Such system level data might include industry reports, news, postings, and the like that are sharable among tenants.

In certain aspects, client systems 12 communicate with application servers 100 to request and update system-level and tenant-level data from MTS 16 that may require one or more queries to database system 106 and/or database system 108. In some embodiments, MTS 16 automatically generates one or more SQL statements (the SQL query) designed to access the desired information.

Each database may generally be viewed as a set of logical tables containing data fitted into predefined categories. Each table typically contains one or more data categories logically arranged in physical columns. Each row of a table typically contains an instance of data for each category defined by the columns. For example, a CRM database may include a table that describes a customer with columns for basic contact information such as name, address, phone number, fax number, etc. Another table may describe a purchase order, including columns for information such as customer, product, sale price, date, etc.

Exemplary Encryption of References to Resources

Figures 3A, 3B:
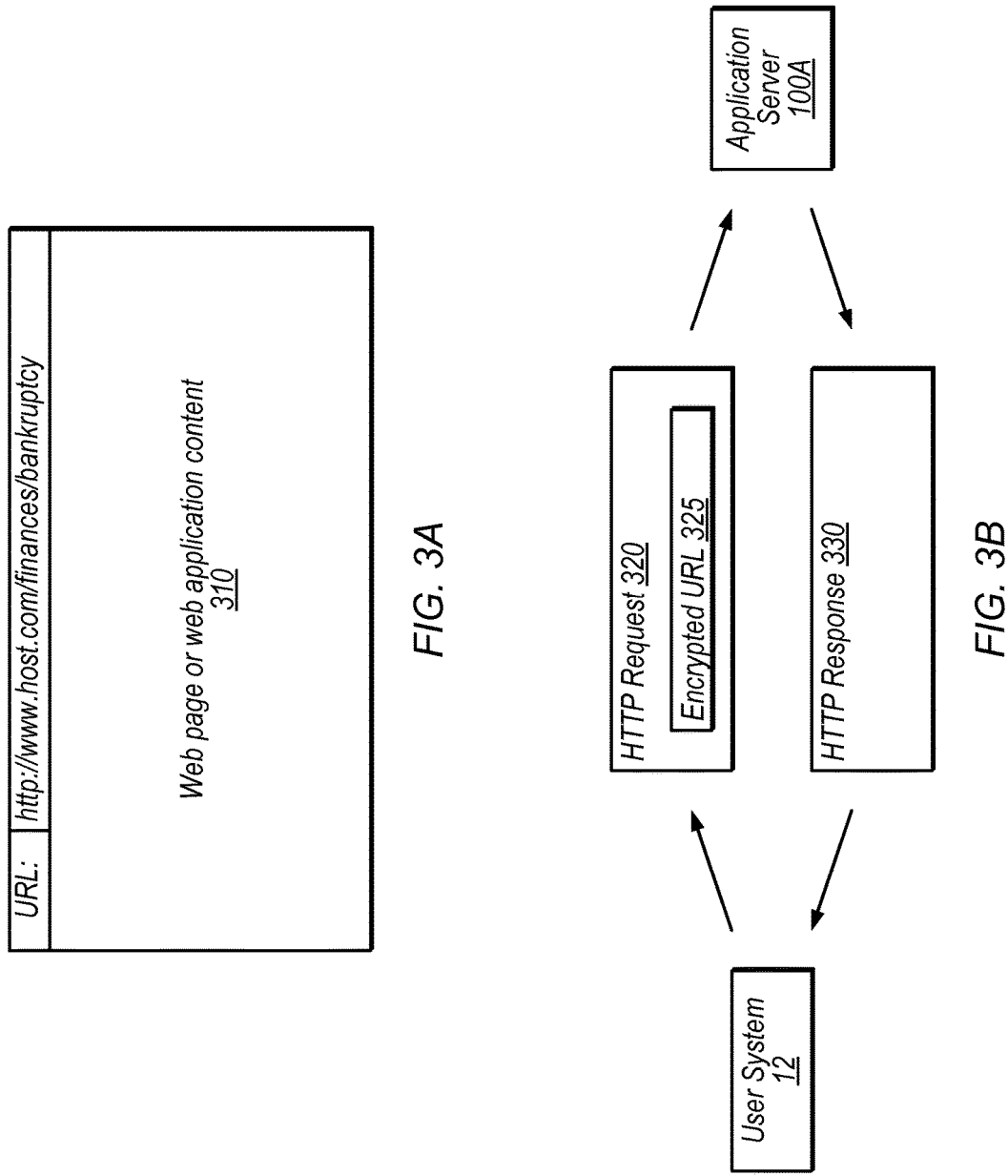
FIGS. 3A-3B illustrate resource request techniques using an encrypted reference, according to some embodiments.

Turning now to FIG. 3A, an exemplary browser window is shown. In the illustrated embodiment, a uniform resource locator (URL) is entered into the browser and a desired web page or web application content 310 is displayed. In some embodiments, the browser is used to access content provided by MTS 16. In some embodiments, the client device transmits a Hyper Text Transfer Protocol (HTTP) request (generated by the browser, for example) to the host device that includes the URL. In these embodiments, the host device responds with the requested resources (e.g., a web page or web application).

In some instances, content of URLs themselves may include information that a user would not want divulged to third parties. For example, the URL "http://www.host.com/finances/bankruptcy" shown in FIG. 3A may indicate that the user requesting that resource is having financial difficulties. In some cases, URLs may include information usable in additional attacks against a client. For example, a poorly crafted web application might include a user password or other sensitive information in the URL. Also, simply knowing what resources the user is requesting may facilitate replay attacks and/or masquerading as either the host or user. In multi-tenant databases, for example, different tenants may have differing levels of sophistication in providing secure applications and/or differing levels of control over potentially malicious employees, so it may be desirable for a provider of multi-tenant database system 16 to provide centralized tools for protecting user URLs.

FIG. 3B shows an exemplary embodiment of URL encryption. In the illustrated embodiment, user system 12 transmits an HTTP request 320 to application server 100A, which responds with HTTP response 330. Note that HTTP requests and response are discussed herein for exemplary purposes, but the scope of the present disclosure is in no way limited to HTTP. In the illustrated embodiment, HTTP request 320 includes an encrypted URL 325. In the illustrated embodiment, application server 100A is configured to decrypt the encrypted URL and provide a resource specified by the decrypted URL to user system 12 (which may also be referred to as a client system). As used herein, the term "encrypt" is intended to be construed according to its well-understood meaning in the art, which includes converting information or data from one form into another to prevent or reduce unauthorized access.

Encrypted URL 325 may be encrypted in various ways in various embodiments. In some embodiments, application server 100A is configured to provide encrypted URLs to user system 12. For example, a link from the host.com main page to the "bankruptcy" page may be encrypted before being imbedded in the main page and provided to the user. Thus, when a user clicks on the "bankruptcy" link, the request transmitted by the user device may include the encrypted URL, which is then decrypted by application server 100A. In some situations, however, this may be insufficient to encrypt all references from the client. For example, web applications often allow a client device to dynamically generate URLs rather than receiving them from a host system (i.e., the host system does not provide the URL to the client system, although it may provide the client with information usable to generate the URL). In these situations, the client may use local variables, information, or input, in conjunction with program instructions in the web application, to dynamically generate URLs. In some embodiments, a dynamically generated reference may include additional information, beyond identification of a desired resource (e.g., information specifying how the resource should be accessed or provided). In this situation, the host system cannot encrypt the URL, e.g., because it does not know what the URL will be until it is generated by the client. Therefore, in some embodiments, user system 12 is configured to perform the encryption to generate encrypted URL 325.

The following code provides one example of an HTTP GET request, which may be generated by a browser and includes a reference to a desired resource:

---

GET /finances/banruptcy.html HTTP/1.1
Host: www.host.com
Accept: image/gif, image/jpeg, */*
Accept-Language: en-us
Accept-Encoding: gzip, deflate
User-Agent: Mozilla/4.0 (compatible; MSIE 6.0; Windows NT 5.1)

---

In some embodiments, user system 12 is configured to encrypt the reference portion ("/finances/bankrupty.html" in this case) of the GET request using a particular encryption technique such that, when the first line of the GET request is sent to the host, a portion of the line corresponding to at least the reference is encrypted (e.g., "GET [encrypted reference] HTTP/1.1"). This action results in a request having a first portion encrypted using the particular technique (the reference to the resource) and a second portion that is not encrypted using the particular technique. In some embodiments, the portions encrypted using the particular technique may include additional portions of the request, such as the language, accepted resource types, etc. Note that the second portion may be encrypted using another technique (e.g., a different type of encryption or the same type of encryption with different inputs), or may not be encrypted at all. For example, in some systems, all communications between a host and client may be encrypted in a blanket manner, resulting in two layers of encryption (the particular encryption technique and the blanket encryption) for the reference to the resource.

Various types of encryption may be implemented by user system 12. In some embodiments, application server 100A stores a private key and provides a public key to user system 12. In these embodiments, user system 12 may encrypt references using the public key and application server 100A may decrypt references using the private key. In some embodiments, user system 12 and application server 100A negotiate a shared secret that is used to encrypt and decrypt URLs.

In some embodiments, various pieces of information may be used as inputs to the encryption. For example, session information (e.g., a session ID) between user system 12 and application server 100A may be used in encrypting and decrypting the reference. In some embodiments, a timestamp or other information may also be used in encrypting the reference. This may further increase the difficulty for malicious attackers attempting to decrypt communications and/or spoof or masquerade as user system 12 or application server 100A.

In some embodiments application server 100A is configured to provide program instructions (e.g., HTTP code, Visualforce, JavaScript, etc.) that are executable, interpretable, or otherwise usable by user system 12 to perform the encryption. This may be advantageous, in some embodiments, because it may allow user system 12 to utilize a standard browser (e.g., without specialized plugins). In other embodiments, however, a browser on user system 12 is configured to perform the encryption without receiving program instructions for doing so from application server 100A, e.g., using one or more browser plugins.

In some embodiments, application server 100A is configured to rotate a reference to a resource during different time intervals. For example, application server may change the reference used to access a given resource periodically and may refuse to provide the resource in response to requests that use expired references. In some embodiments, application server 100A is configured to implement limited-use or single-use references that are allowed to be used a limited number of times. Once the reference has been used a particular number of times, application server 100A may subsequently refuse to provide the resource in response to that particular reference. In some embodiments, the URL rotation may be performed host-side only, but in some embodiments the URL rotation may be included in the encryption, e.g., such that the encryption technique or information changes after a given time period or number of requests. In some embodiments, these techniques may protect against replay attacks, e.g., by limiting the time period in which a malicious entity can re-use an intercepted reference.

In some embodiments, application server 100A and/or multi-tenant database system 16 are configured to allow a high degree of configurability of resource encryption. For example, system 16 may specify URL encryption for some tenants and not others (e.g., based on tenant preferences). System 16 may specify URL encryption for some users and not others (e.g., based on user and/or tenant preferences). System 16 may specify URL encryption for some types of devices and not others (e.g., for mobile devices but not for workstations, etc.). System 16 may specify URL encryption for certain resources and not others. System 16 may specify URL encryption during particular time intervals and not others. System 16 may specify URL encryption for particular platforms (e.g., Android or Windows) and not others. In these embodiments, various configuration parameters for these settings may be adjustable by administrators and/or users of system 16.

Note that HTTP communications, as described herein, encompass secure HTTPS communications, which involve layering HTTP on some other protocol such as SSL or TLS, for example. HTTPS may provide authentication and bidirectional data encryption. Further, HTTP is used herein for exemplary purposes, but is not intended to limit the scope of the disclosure. In other embodiments, any of various communications protocols may be implemented in addition to and/or in place of HTTP. Similarly, URLs and URIs are discussed herein as an example of a reference to a network resource, but the disclosed techniques may be implemented for various types of references. URLs are discussed for purposes of explanation but are not intended to limit the scope of the disclosure. As used herein, the term "reference" refers to information that specifies, alone or in combination with other information, a desired electronic resource provided by some type of host system. In some embodiments, the electronic resource is a web resource.

Exemplary Methods

Figure 4:
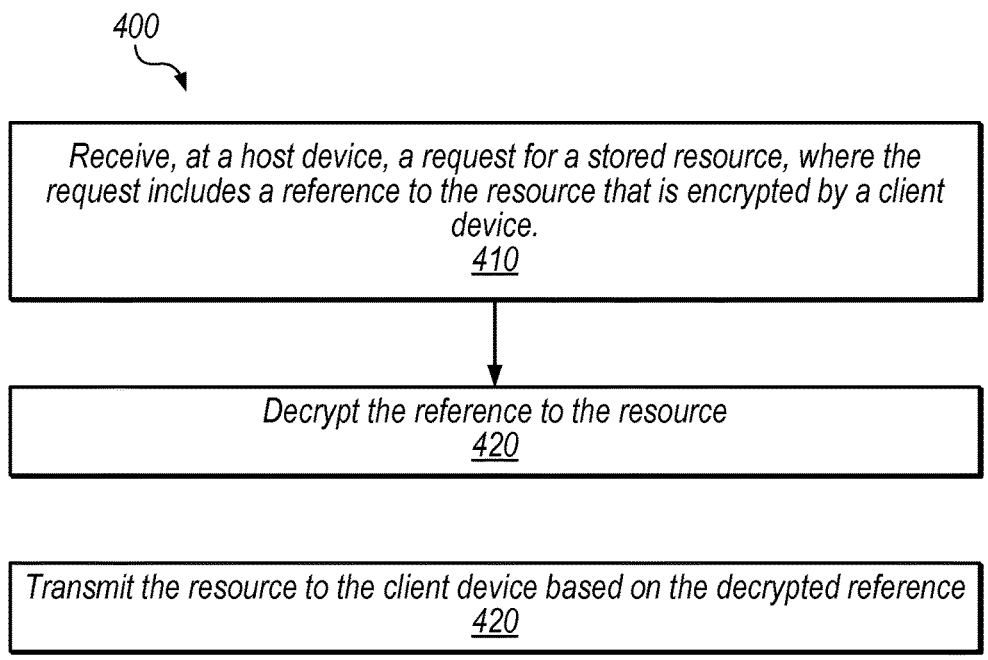
FIGS. 4-5 are a flow diagram illustrating exemplary methods relating to client-side encryption of references to network resources, according to some embodiments.

Turning now to FIG. 4, a flow diagram illustrating one exemplary embodiment of a method 400 relating to client-side reference encryption is shown. The method shown in FIG. 4 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 410.

At 410, a request for a resource is received at a host device. In this embodiment, the request includes a reference to the resource that is encrypted by a client device. In some embodiments, a first portion of the request that includes the resource is encrypted using a particular encryption technique while other portions of the request are not encrypted using the particular encryption technique. In some embodiments, the resource is a URL. In some embodiments, the host device transmits program instructions that are usable to encrypt references to stored resources using the particular encryption technique. In some embodiments, the host device is configured to enforce a limited-use policy for the reference. In some embodiments, the host device does not provide the reference to the resource and the reference is dynamically generated by the client device.

At 420, the reference to the resource is decrypted. In some embodiments this includes using a private key to decode the reference and the reference is encrypted using a public key.

At 430, the resource is transmitted to the client device based on the decrypted reference. For example, the host device may access a database using the reference, and read the resource from the database.

Figure 5:
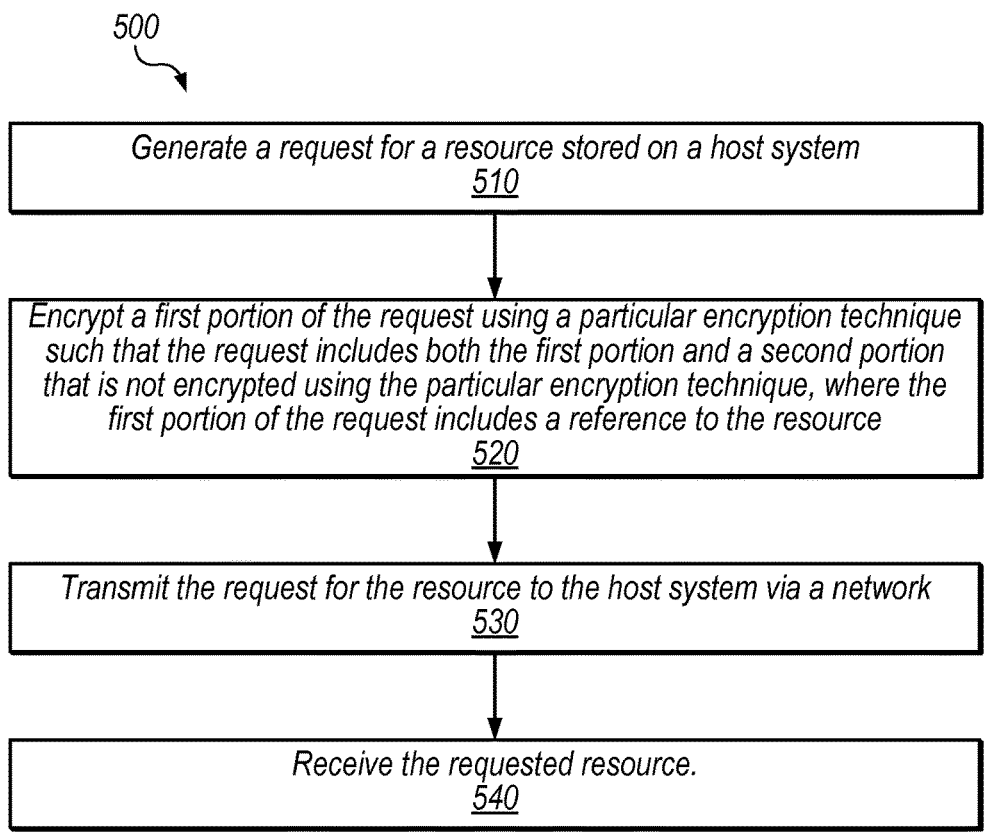

Turning now to FIG. 5, a flow diagram illustrating one exemplary embodiment of a method 500 for client-side reference encryption is shown. The method shown in FIG. 5 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 510.

At 510, a request for a resource stored on a host system is generated. The request may be generated based on a user action, such as clicking a link, for example. In some embodiments, the request is dynamically generated.

At 520, a first portion of the request is encrypted using a particular encryption technique such that the request includes both the first portion and a second portion that is not encrypted using the particular encryption technique, where the first portion of the request includes a reference to the resource. In some embodiments, the encryption is performed using program instructions received from the host device, e.g., as part of a web application.

At 530, the request for the resource is transmitted to the host system via a network. In some embodiments, the request is an HTTP request.

At 540, the requested resource is received from the host system. The host system may decrypt the reference, as discussed with reference to step 420 of FIG. 4, for example, and provide the resource based on the decrypted reference.

Various operations described herein may be implemented by a computing device configured to execute program instructions that specify the operations. Similarly, various operations may be performed by circuitry desired or configured to perform the operations. In some embodiments, a non-transitory computer-readable medium has program instructions stored thereon that are capable of causing various operations described herein. As used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable medium having computer instructions stored thereon that are executable to perform operations comprising:

a host device transmitting program instructions to a client device via a network, wherein the program instructions are executable to encrypt references to stored resources using a particular encryption technique;

the host device receiving, via the network, a hypertext transfer protocol request for a stored resource, wherein a first portion of the request is encrypted by the client device using the program instructions to perform the particular encryption technique and a second portion of the request is not encrypted using the particular encryption technique, wherein the first portion of the request includes a reference to the resource that is a uniform resource locator (URL), and wherein data in the second portion of the request is encrypted using a different encryption technique;

determining whether to decrypt the resource based on one or more configurable parameters that specify whether to perform decryption for requests to access the stored resource;

decrypting the reference to the resource, wherein the decrypting includes decrypting the reference using session information associated with a communication session between the host device and the client device and wherein the reference is a limited-use reference that is invalid after a particular number of requests for the resource;

providing the resource to the client device based on the decrypted reference; and refusing to provide the resource after detecting the particular number of requests for the resource using the reference.

2. The non-transitory computer-readable medium of claim 1, wherein the operations further comprise:
refusing to provide the resource in response to a request that includes the reference after a particular time interval.

3. The non-transitory computer-readable medium of claim 1, wherein the reference to the resource is dynamically generated by the client device and is not provided to the client device by the host device.

4. The non-transitory computer-readable medium of claim 1, wherein the operations further comprise:
decrypting references to resources stored in a multi-tenant database, wherein the references are included in requests from multiple different tenants.

5. The non-transitory computer-readable medium of claim 4, wherein the one or more configurable parameters further specify at least one of: whether to perform decryption for a particular tenant, whether to perform encryption for particular types of devices, or whether to perform encryption for a particular user.

6. The non-transitory computer-readable medium of claim 1, wherein the reference is encrypted using a public key, wherein the decrypting includes using a private key to decrypt the reference.

7. A method, comprising:
a host device transmitting program instructions to a client device via a network, wherein the program instructions are executable to encrypt references to stored resources using a particular encryption technique;
receiving, by the host device, a hypertext transfer protocol request for a stored resource, wherein a first portion of the request is encrypted by a client device using the program instructions to perform the particular encryption technique and a second portion of the request is not encrypted using the particular encryption technique, and wherein the first portion of the request includes a reference to the resource that is a uniform resource locator (URL), and wherein data in the second portion of the request is encrypted using a different encryption technique;
determining, by the host device, whether to decrypt the resource based on one or more configurable parameters that specify whether to perform decryption for requests to access the stored resource;
the host device decrypting the reference to the resource, wherein the decrypting includes decrypting the reference using session information associated with a communication session between the host device and the client device and wherein the reference is a limited-use reference that is invalid after a particular number of requests for the resource; and
the host device transmitting the resource to the client device based on the decrypted reference; and
the host device refusing to provide the resource in response to a subsequent request after detecting the particular number of requests for the resource using the reference.

8. The method of claim 7, further comprising:
associating a new reference with the resource; and
refusing to provide the reference in response to a request that includes the reference but does not include the new reference.

9. The method of claim 8, wherein the new reference is based on a timestamp.

10. The method of claim 7, wherein the reference to the resource is generated by the client device, and the host device does not provide the reference to the client device.

11. A method, comprising:
a client device receiving, via a network, program instructions usable to encrypt, using a particular encryption technique, references to resources stored on a host system;
the client device generating a hypertext transfer protocol request for a resource stored on a host system;
the client device encrypting a first portion of the request using the program instructions to perform the particular encryption technique, wherein the client device does not encrypt a second portion of the request using the particular encryption technique, wherein the first portion of the request includes a reference to the resource that is a uniform resource locator (URL), wherein the reference is a limited-use reference that is invalid after a particular number of requests for the resources, wherein the encryption of the first portion of the request is based on one or more configurable parameters that specify whether to perform encryption for requests to access the stored resource, and wherein the encryption of the first portion of the request uses session information associated with a communication session between a host device and the client device and;
the client device encrypting at least a second portion of the request using a second, different encryption technique;
the client device transmitting the request for the resource to the host system via a network, wherein the request includes both the first portion and a second portion that is not encrypted using the particular encryption technique;
the client device receiving the requested resource; and
the client device receiving a refusal to provide the resource in response to a subsequent request after detection of the particular number of requests for the resource using the reference.

12. The method of claim 11, further comprising:
the client device dynamically generating the reference to the resource, wherein the client device does not receive the reference from the host system.

13. The method of claim 11, wherein the encrypting is based on a session identifier and a timestamp.

* * * * *